Figure 1:
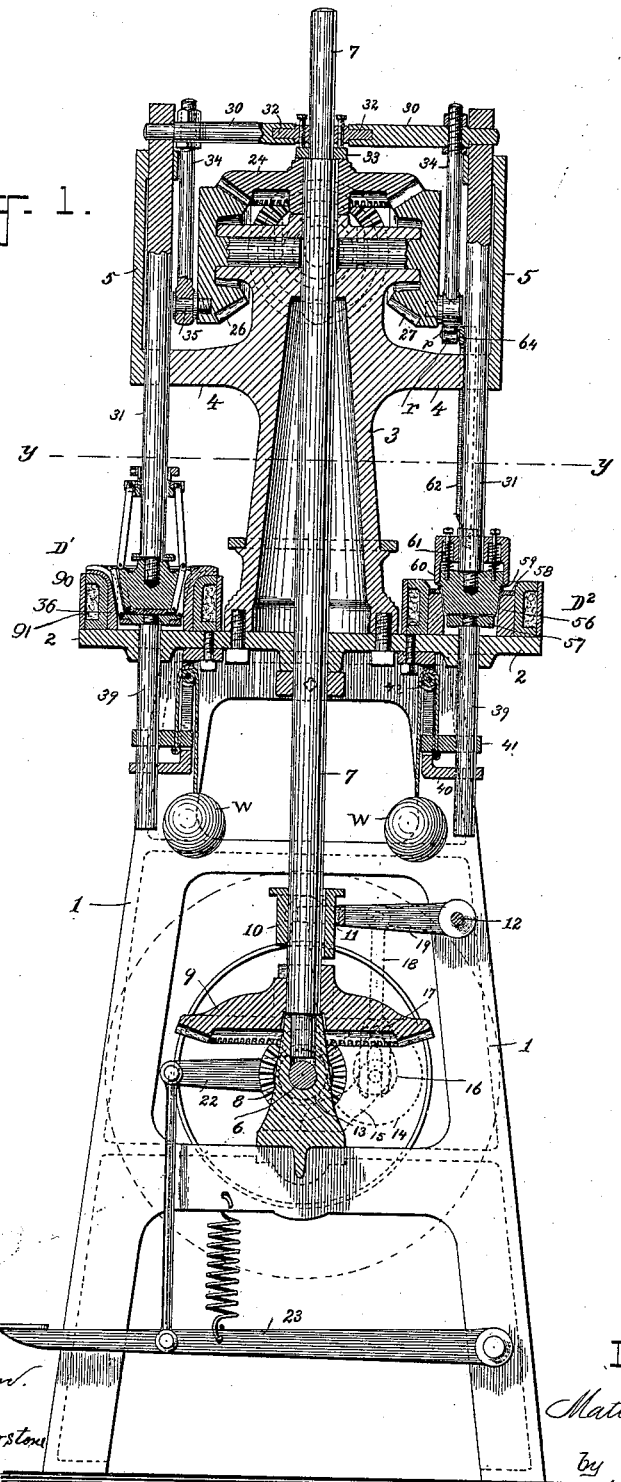

(No Model.)  4 Sheets—Sheet 1.

M. VIERENGEL.
MACHINE FOR MAKING PLAITED BOXES OR SIMILAR ARTICLES.

No. 463,849.  Patented Nov. 24, 1891.

Witnesses.
John F. Nelson.
Mary J. Featherstone

Inventor.
Matthew Vierengel
by
Atty (No Model.) 4 Sheets—Sheet 2.

M. VIERENGEL.
MACHINE FOR MAKING PLAITED BOXES OR SIMILAR ARTICLES.

No. 463,849. Patented Nov. 24, 1891.

Witnesses.
John F. Nelson.
Mary I. Featherstone

Inventor.
Matthew Vierengel
by Britton & Donn
Atty (No Model.) 4 Sheets—Sheet 3.
M. VIERENGEL.
MACHINE FOR MAKING PLAITED BOXES OR SIMILAR ARTICLES.
No. 463,849. Patented Nov. 24, 1891.
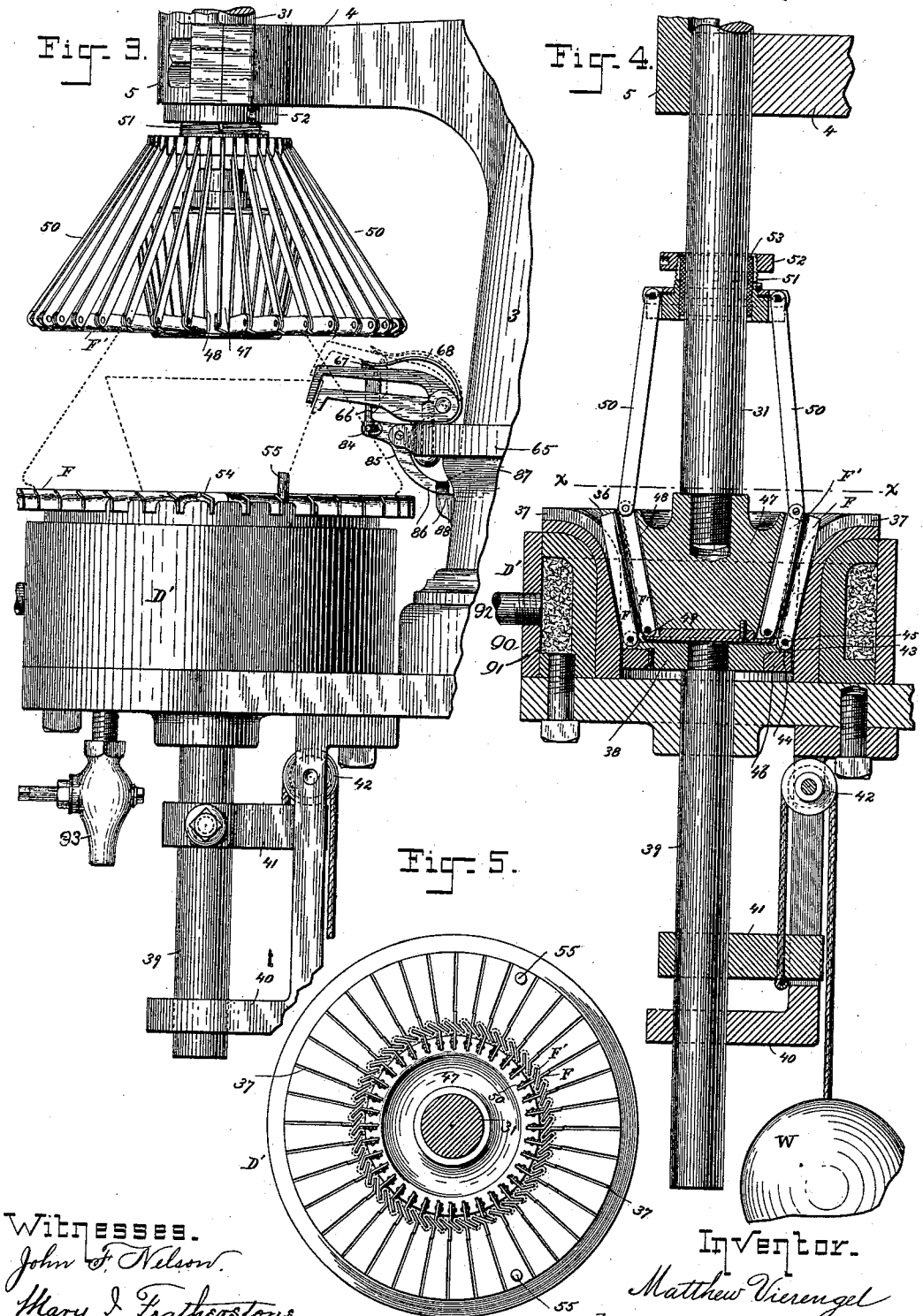
Witnesses.
John F. Nelson.
Mary I. Featherstone.
Inventor.
Matthew Vierengel
by Urittenlehown
Atty.

(No Model.) 4 Sheets—Sheet 4.
M. VIERENGEL.
MACHINE FOR MAKING PLAITED BOXES OR SIMILAR ARTICLES.
No. 463,849. Patented Nov. 24, 1891.
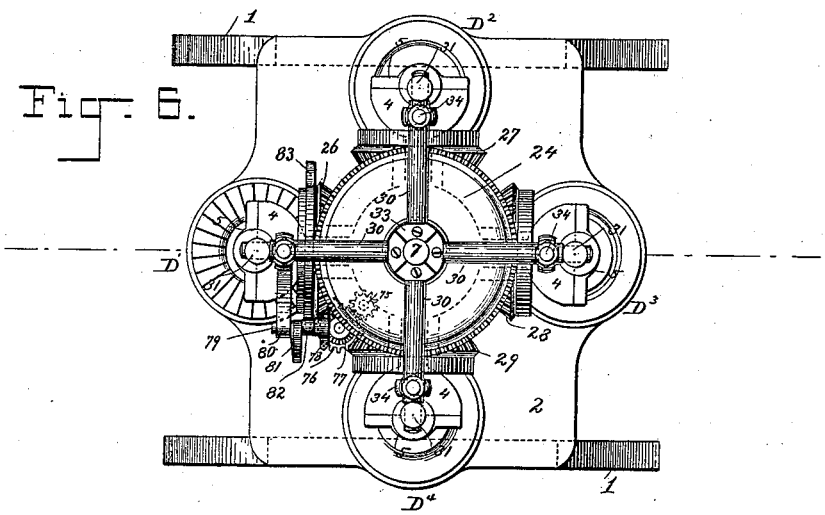
Fig. 6.
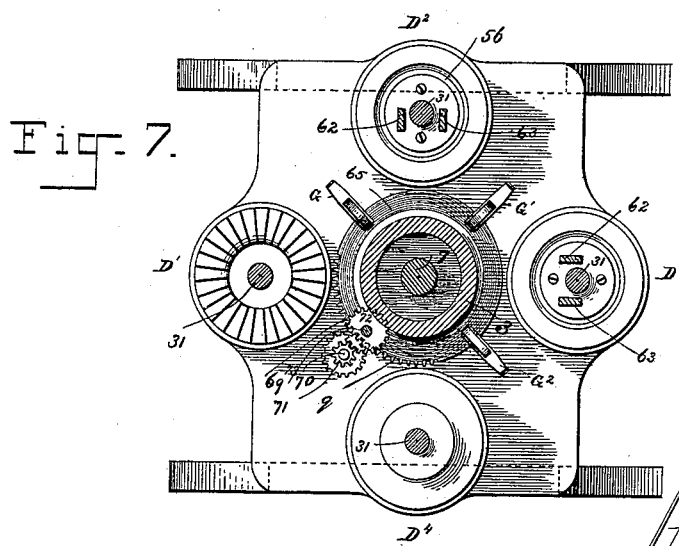
Fig. 7.
Fig. 8.
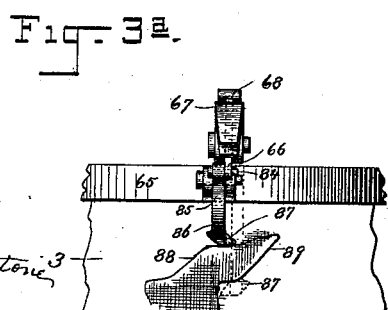
Fig. 3ᵃ.
Witnesses.
John F. Nelson.
Mary J. Featherstone.
Inventor.
Matthew Vierengel
by Whittlesey Dunn
Atty
THE NORRIS PETERS CO., PHOTO-LITHO., WASHINGTON, D. C.

UNITED STATES PATENT OFFICE.

MATTHEW VIERENGEL, OF BROOKLYN, NEW YORK, ASSIGNOR TO ROBERT GAIR, OF SAME PLACE.

MACHINE FOR MAKING PLAITED BOXES OR SIMILAR ARTICLES.

SPECIFICATION forming part of Letters Patent No. 463,849, dated November 24, 1891.

Application filed September 30, 1889. Serial No. 325,495. (No model.)

*To all whom it may concern:*

Be it known that I, MATTHEW VIERENGEL, a citizen of the United States, residing at Brooklyn, in the county of Kings and State of New York, have invented a new and useful Method of and Machine for Making Plaited Boxes or Similar Articles, of which the following is a specification.

My invention relates to the manufacture of that class of cups, boxes, caps, &c., which have the sides formed into folds or plaits and in some instances their edges turned over one or more times to form a double or triple folded edge.

The object of my invention is, first, to form a blank into a box, cup, cap, or similar article and fold or gather the sides of the same into plaits by one operation; secondly, to transfer the article after being formed and plaited to edging, pressing, and embossing dies, so that the successive operations shall be performed on the article automatically after feeding the blank to the forming and plaiting die; thirdly, to produce a machine in which, by suitable mechanism, a blank of any suitable material can be converted by one operation into an article of the desired shape and with its sides gathered into folds or plaits, and by other mechanism automatically transferred to another part of the machine, where the plaits are pressed together to fix them in their form and position and the edges turned over once, then again automatically transferred to other mechanism, where a further pressure is given to the article and an additional fold given to the edge, and, finally, automatically transferred to another part of the machine, where the article may be finished and embossed by a suitable die, as desired.

Figure 2:
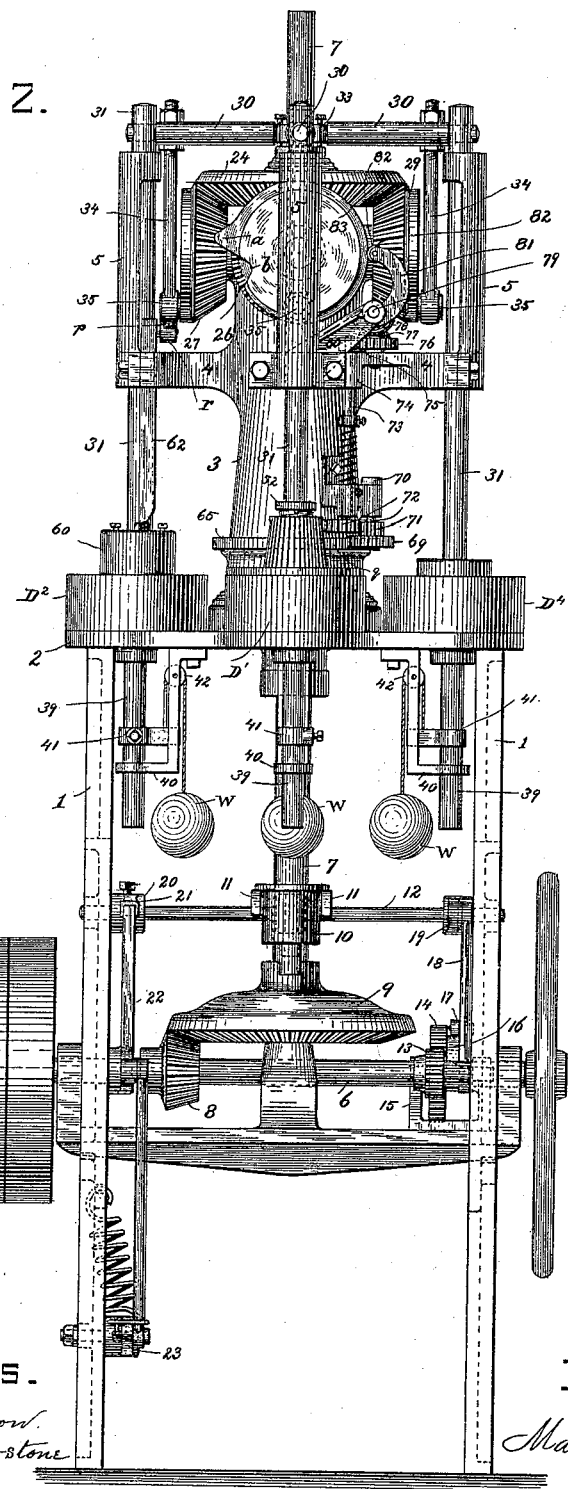

In the accompanying drawings, Figure 1 represents a vertical transverse section of a machine embodying the principles of my invention, the section being taken through the center of the machine; Fig. 2, an elevation of a machine with four sets of dies for performing four operations on the article in succession; Fig. 3, an enlarged view in elevation of the mechanism for forming and plaiting the article, and the device for plaiting the same and transferring it to the second stage of operation; Fig. 3ª, a front elevation of the transferring mechanism or gripper with the device for opening and closing the same; Fig 4, a vertical transverse section of Fig. 3; Fig. 5, a horizontal section of the same, taken on line *x x* of Fig. 4; Fig. 6, a plan of the machine shown in Fig. 2, and Fig. 7 a horizontal section taken on line *y y* of Fig. 1. Fig. 8 represents the plaiting-fingers, showing in detail the form of the fingers for the inner and outer dies and their relative positions.

Referring to the drawings, the frame of the machine consists of a stand 1, table 2, and column 3, rising from the table and provided with horizontal radial arms 4, that terminate with upright projections 5, that form guides for the several plunger-shafts hereinafter referred to. The stand supports the driving-shaft 6, the trip mechanism presently described, and the lower end of a vertical power-transmitting shaft 7, whose upper end is supported by a suitable bearing in the head of the column 3, through which it is passed. The driving-shaft carries a beveled pinion 8, that intermeshes with a beveled clutch-wheel 9 on the vertical shaft. On the same shaft is a clutch-box 10, connected with the said shaft by a feather in the usual manner. The clutch-box is provided with a flange, under which rest the arms 11 of a lever connected with a transverse shaft 12, arranged to oscillate in its bearings.

On the driving-shaft at one side of the frame is a pinion 13 in gear with a spur-wheel 14, the shaft of which is journaled in a bracket 15, (these parts being indicated by dotted lines on Fig. 1,) said spur-wheel carrying a cam 16, that bears against a roller 17 on a forked connecting-rod 18, whose upper end is pivoted to the lever 19 and lower forked end is placed over the shaft of the spur-wheel 14. On the opposite side a hub 20 is placed on the shaft and secured by a set-screw, from which an arm 21 projects. A bell-crank lever 22 is hung on the driving-shaft and has one arm in proximity to the arm 21 and the other connected by a rod with a spring-treadle 23.

The devices just described are for the purpose of throwing the driving-shaft in and out of gear, and the operation is as follows: When the blank is placed in position to receive the first impression, the operator presses on the treadle, thereby throwing the bell-crank arm from under the arm 21 and (the cam being in proper position) the clutch-box drops, and the clutch puts the vertical shaft in gear with the driving-shaft. At the end of every second revolution of the driving-shaft the cam 16 lifts rod 18 and lever 19, thereby turning the shaft 12 and arms 11, lifting the clutch-box, throwing the shaft out of gear with the driving-wheel, and stopping the mechanism. The treadle having in the meantime been released, its spring lifts it, and the arm of the bell-crank lever is turned into position to engage the end of arm 21, and thereby hold the clutch-box up, when the cam passes from under the roller on the rod 18. The cam should be made so as to dwell for a moment in its lifting position in order to hold the rod up until the bell-crank arm catches under the arm 21. In this way, as will readily be seen, the driving-shaft is thrown out of engagement with the transmitting-shaft at the end of every second revolution automatically, while it is put into engagement at will by means of the treadle. A beveled wheel 24 above the column 3 is fixed to shaft 7 and meshes with four beveled wheels 26, 27, 28, and 29. Above the wheel 24 are four oscillating shafts 30, each of which has its outer end pivoted in one of the plunger-rods 31, while their inner ends are pivoted to staffs 32, projecting from a disk 33, through which the shaft 27 passes and forms a guide for the disk when the latter moves up and down. Pitman-rods 34 connect shafts 30 with crank-pins 35 on the beveled wheels 26 27, &c. By means of these pitmen when the shaft 7 is in gear with the driving-shaft a reciprocating motion is communicated to each of the plunger-rods 31, the latter moving in guides in the arms 4 and their upright extensions 5, as shown.

Around the column 3 at equal distances apart and immediately under the plunger-rod are placed the dies for forming, plaiting, edging, and finishing the articles. These dies are numbered D′, D², D³, and D⁴, in the order in which they perform their respective operations. The inner part of each die is connected with one of the plunger-rods 31 and the outer part with the table. Die D′ performs the first operation on the blank—viz., that of turning up the sides and forming the plaits. It consists of a bell-shaped cup 36 under and centered with the plunger-rod 31 above it. On the inside the cup is provided with equidistant vertical grooves 37, commencing a short distance above the bottom and gradually increasing in depth up to the commencement of the bell, from which point to their ends their depth is uniform. In the cup is a vertically-movable disk 38, fixed to a rod 39, passed down through a hole in the table and a guide in the bracket 40, the said rod being provided with a clamp 41, that slides in a slot in the upright part of the bracket, and the clamp being connected by means of a rope or chain running over a pulley with a weight W, which tends to move the disk up to the top of the cup, the distance being limited by the clamp coming in contact with the pulley 42, as shown in Fig. 3.

The devices for forming the plaits consist of two sets of fingers F F′, one for each part of the die D′, connected with the said parts in a peculiar manner, as follows: In the periphery of the disk 38 of the outer part 36 are radial slots 43, that correspond in number and position with the grooves 37 in the cup. In the under side of said disk a seat is turned, and in the flange thus formed an annular groove 44 is made. The outer plaiting-fingers F are connected with the disk by placing them on an annular pivot 45, that fits into the groove 44, the lower ends of the fingers being thus held in the slots in the disk, and their outer edges rest in the grooves 37, the upper ends being free. The pivot 45 is retained in its seat by means of an annular keeper 46, placed in the seat in the disk and secured therein by screws or other suitable devices. The inner die is composed of a plunger 47, fixed to the end of the shaft 31, and plaiting-fingers connected therewith in a manner similar to those last described. In the surface of the conical plunger are longitudinal grooves 48, that lie in the same radial plane as the grooves in the cup. These grooves receive the inner-die plaiting-fingers F′. In the lower end of the conical plunger, in line with the grooves 48, is an annular groove 49, and the annular pivot on which the fingers are placed, being placed in the groove, are held therein by a circular plate secured to the lower end of the plunger by screws or other suitable devices. The plate has its periphery turned down on its upper side to the depth of the groove in the plunger in order to give space for the ends of the fingers. The upper ends of the fingers are pivoted to the lower ends of the rods 50, and these in turn have their upper ends pivoted to a sleeve on the rod 31, the periphery of the sleeve being slotted to receive the bars, which are connected to the sleeve by means of an annular pivot arranged substantially the same as that heretofore described. The sleeve has a slotted, conical, and threaded extension 51, over which is secured a compressing-ring 52, and between the sleeve and the rod is a suitable packing 53, by means of which and the compressing-ring the sleeve can be tightened on the rod at will.

The plaiting-fingers F F′ consist of flat pieces of metal having the outer side edge turned at an obtuse angle and forming a flange 54. The flanges on both fingers are wider at the top than at the bottom, the edge inclining toward the straight part of the fingers, so that at the lower end they are nearly or quite flush with the broad side of the finger. The straight part only of the fingers enters the grooves, the flanges remaining out in both parts of the die. The fingers are arranged so that the flanges of the respective sets all point in one direction. Furthermore, the flanges of the fingers of the outer part of the die point in an opposite direction to those of the inner part, the faces of the flanges of fingers F being close to but not in contact with the faces of the flanges of fingers F', while the edges of the flanges of one part are about half-way between the grooves of the other part. The relative positions of the fingers and their flanges may be readily understood by referring to Fig. 5, where they are clearly shown. The grooves in both parts of the die serve as guides and sheaths for the fingers by which they are held firmly while forming the plaits, and into which the straight parts retire as the two sets of fingers approach each other during the descent of the plunger into the outer part of the die.

Both sets of plaiting-fingers have a vibratory motion on their pivots as the plunger and disk that carry them move up and down. Thus when the plunger moves upward the fingers remain sheathed in the slots in the plunger, the flanges only projecting until the compressing-ring 52 on the sleeve reaches the arm, whereupon as the rod continues to move upward, while the upper ends of the bars remain stationary, the plunger lifts the lower ends of the fingers, and the latter are forced out of their slots and into a horizontal position, as shown in Fig. 3. This movement of the fingers commences after the plunger has passed out of the cup, and it is designed to strip the plaited article off the fingers. When the plunger is leaving the cup, the weight causes the rod to raise the disk 38 until the clamp strikes the pulley, at which time the disk is just above the top of the cup 36, and during this upward motion the fingers F turn on their pivots outward by their own weight, and following their grooves they finally, when the disk reaches its upward position, come to a horizontal position, as shown in Fig. 3, and while approaching this position the flanges leave the plaits in the article which is lifted by the disk to the top of the cup.

Fig. 3 represents the normal position of the two sets of plaiting-fingers, and Fig. 4 their position at the end of the downward stroke of the plunger.

The operation of forming a plaited cup, box, or cap is follows: A blank of paper of the proper shape (in this instance round, as that is the shape of the die) is placed on the top of the lower part or cup 36 and adjusted to position by placing its edges against the guide-pins 55. The blank, it will be understood, rests on the edges of the flanges of fingers F and on disk 38. The plunger is now caused to descend, and with it the fingers F', which are retained in their horizontal position by the sleeve, as indicated by the dotted lines in Fig. 3. The plunger bears on the paper which is held between the plunger and disk 38, the part thus held forming the bottom of the article, while outside of the disk and plunger the paper is held between the flanges of fingers F F'. The plunger and disk continuing to descend, the fingers F' are caused by the resistance of fingers F and the paper to turn upon their pivots toward the plunger, and as the fingers F are forced to turn with them the part of the blank outside of the disk is forced to turn up with the fingers, the result being that the parts clasped between the flanges of the two sets of fingers is gathered into plaits, as indicated by the dotted lines in Fig. 5. As the flanges widen toward the extremities, the plaits likewise widen toward the top, thus compensating for the increasing area of material gathered into the plaits as the edges of the blank are approached. In Fig. 5 the dotted lines represent the paper, and here is shown the relative positions the flanges of the two sets of fingers bear to each other, and the plaits are also plainly shown in dotted lines. When the plunger reaches the limit of its downward motion, it commences to return, and with it the disk. As the disk ascends its fingers F slip out from between the folds of the plaits and leave the cup free. At about the same time the sleeve reaches its extreme upper position, the cup being still held by the fingers of the plunger; but as the plunger moves upward it draws the flanges of its fingers out of the plaits in the cup and the latter is left standing upright on the disk, as indicated by the dotted lines in Fig. 3, ready to be carried to the next die. The succeeding die $D^2$ consists, merely, of a plain conical cup 56 placed on the table and provided with a weight-controlled disk 57, the same substantially as the similar parts last described, and a conical plunger operated in the same manner as the plunger of the die D'; but on the top of the conical socket part is placed a ring 58, which has an upwardly-turned collar 59. The base of the conical plunger is cylindrical and of about the same diameter as the exterior of the collar. Over the base of the plunger is placed an inverted-cup-shaped edge-turner 60, the interior diameter of which is such as will pass over the cylindrical base of the plunger and move freely up and down. This edge-turner is held up by means of springs 61, and it is forced down by the following mechanism: Two parallel bars 62 63, placed on opposite sides of the plunger-shaft, have their lower ends inserted in sockets in the bottom of the edge-turner, set-nuts being placed in the said ends, which bear against the edge-turner and serve to adjust the length of its movement. The bars pass through ways (not shown) in arm 4 and are connected by cross-bars 64, that carry a roller r in position to be engaged by a cam p on pitman 34. This cam is not exactly in line with the longitudinal axis of the pitman, but just far enough out of said line to make the downward motion of the bars 62 63 and edge-turner 60 a little later than the same motion of the plunger-rod and plunger. Thus when the plunger is forced down into the outer part of the die to the limit of its motion the edge-turner follows and its lower edge passes outside of the collar 59. The function of the dies $D^2$ and $D^3$ are to press the plaits of the cup tightly together and take away the loose appearance the cup has when it leaves the plaiting-die, while the edge-turner is for the purpose of turning over the edge of the cup for the purpose of stiffening it. When the plaited cup is taken from the plaiting-die, it is carried to the pressing-die and dropped into the cup part, so as to stand on the disk in an upright position. The plunger now descends and forces the cup downward, pressing its plaited sides between itself and the sides of the cup. At this stage the die and cup are in the position represented in Fig. 1, where it will be observed the edges of the cup are caught between the top of the collar and the cylindrical part of the plunger, and by the projecting edges of the latter the edges are turned outward at about right angles. The edge-turner now descends and bearing on the edge of the cup forces it down between itself and the collar, thus giving one fold over to the edge. The cup may now be carried to another die of substantially the same form, construction, and movement as that last described and another turn over to the edge given to the cup, so that the edge will have a triple fold, the only variation from the die $D^2$ necessary being to shorten the length of the conical portion of the plunger and correspondingly lengthen the cylindrical part. When two edge turning and pressing dies are used, the first one will be placed next to the plaiting-die $D'$, instead of opposite to it, as in Fig. 1, and the second opposite to the plaiting-die. For convenience only of description the first edge turning and pressing die is shown opposite the plaiting-die in Fig. 1, the correct arrangement being shown in Figs. 2 and 6. The fourth die $D^4$, Figs. 2 and 6, is not shown in detail, as it is merely a finishing-die arranged to press the plaits and edges down flat, and, if desired, to emboss the plaited article in the bottom with name, design, trade-mark, or other device or inscription.

The devices for automatically transferring the article from one die to the next succeeding one consists of a number of grippers G G' $G^2$ placed on a ring 65, that turns on a ledge around the column 3. The said ring has a toothed quadrant $q$ in its periphery. The grippers consist of two fingers pivoted together, with their points or ends projected outward and downward, so that the end of one finger lies just over the end of the other, so that when the upper finger, which is movable, is pressed down its end presses against the end of the lower finger. Through a slot in the two fingers a latch 66 is passed, it being pivoted in the upper finger and having an inclined projection 67 extending above the top edge, on which the end of a spring 68 presses. This spring serves both to press the fingers together and also to operate the latch to engage the lower finger when the upper finger is forced upward. By the movement of the ring 65 the said fingers are caused to move an eighth of a revolution to the left (see Fig. 7) so as to bring them into position to seize the partly-formed article as it rests on the disk of die $D'$, and then by a further motion of a quarter of a revolution to carry it to the next die $D^2$ and place the same in position to be operated upon by the said die. The mechanism for giving these motions to the gripper and the fingers consists of a spur-wheel 69 on the end of a shaft 70, journaled in a bracket on the column and carrying a pinion 71, that meshes with a wheel 72 on the end of a vertical shaft 73, journaled in said bracket, and an additional bracket 74. On the upper end of this shaft is a pinion 75, that gears into a spur-wheel 76, that carries a beveled pinion 77, which meshes with another beveled segment 78 on a stud 79, pivoted in brackets 80, the said stud carrying a curved rock-lever 81, having at its extreme end a roller 82, which bears against the edge of a cam 83 on the back of the beveled wheel 26 and having a high point $a$ and low point $b$.

The operation is as follows: Commencing with the operation of the plaiting-die, when the inner part of this die rises out of the cup and strips the plaited article off the fingers the high point $a$ of the cam has reached the roller of the lever 81 and thrown the latter to the right. This motion, through the gearing, acts upon the ring 65 and turns the gripper G in line with the axis of the die $D'$, and when the finger is approaching the said axis and just before it reaches that position the fingers are opened by the following mechanism: To the ring 65 is fulcrumed a rock-lever 85, the upper arm of which is provided with a pin 84, which engages a slot in the lower end of the latch 66. The lower arm 86 of the lever curves toward the column under the ring, so that when the ring is moved a toe 87 on its lower end is in position to strike one or the other of the faces of a double cam cast on the column. This cam has an opening face 88 and a closing face 89, and the operation of the said faces in opening and closing the gripper is as follows: When the gripper moves toward the die $D'$ from its at-rest position, Fig. 7, where the fingers are open, the end 87 passes up the face 88 of the cam, thereby turning the lever and throwing the latch back out of engagement with the lower finger, and at the moment the gripper arrives at the proper position the latch is released and the spring 68 closes the fingers on the article, as in Fig. 3. The gripper now moves toward die $D^2$, and when it is close to it the toe 87 passes under the cam-face 89 and moves the lever, so as to force the latch, and with it the upper finger upward, to release the article at the moment the gripper arrives in position to drop the article on the disk of die $D^2$. It will be understood, of course, that the faces of the cam must be formed in such a way that the gripping and releasing of the article will not take place until the gripper is exactly in position to take the article from one die to release it when it reaches a position where it will drop on the disk of the succeeding die. When the finger is opened, the spring forces the latch into position to engage the lower finger and hold the gripper opened until it returns to the die from which it takes the article. For the die D' a cam with a closing face only is required, and for the last die D⁴ one with an opening face only; but for the intermediate dies a double-faced cam, such as is shown in Fig. 3ª, must be used. At the moment the fingers are caused to assume the positions indicated in relation to the cup the high point of the cam passes the roller of the lever 81, and the latter is caused to descend to the low point $b$ of the cam by the force of the spring $s$ on the shaft 73, which has one end fixed in a collar on the shaft and the other end in a socket in the lower bracket. The spring is contracted when the lever is thrown outward by the cam, and as soon as the roller passes off the high point the spring reacts and turns the shaft and through it the ring 65 until stopped by the roller reaching the low point $b$ of the cam. By the motion thus given to the ring 65 it is caused to turn in the direction of die D², and thereby carry the gripper G in that direction. The distance moved by the lever to the high point of the cam is only half that moved by it to the low point. Hence the finger is carried through a space of a quarter of a revolution, and this brings it in line with the axis of the die D², as heretofore stated. The lever thus passing to the low point of the cam the gripper is carried to the succeeding die. The cam 83 continuing to revolve, the roller of lever 82 passes from the low point of the cam to the still of the cam, and thereby the lever is again oscillated back, causing the ring to turn an eighth of a revolution and carry the gripper to the midway position indicated in Fig. 7. It will be observed that there are three grippers used corresponding to the number of transfers necessary to carry the article from the first to the last die D⁴. They all move simultaneously and in the same directions and perform the same operation in the same way of gripping, transferring, and dropping the cup from die to die until the last die is reached, after the action of which on the cup it is removed either by hand or by a suitable mechanical device. The cam 83 is timed in such a manner that the grippers do not reach their positions to take and drop the cup until the movable part of the die rises high enough to allow the gripper to pass under it.

To insure the permanency of the form of the article which it receives from the several dies, the latter should be heated. Any suitable means may be used for this purpose, but by preference in the machine herein shown and described steam heat is employed. To this end the outer and fixed part of each die is inclosed by an annular box 90, in which is a steam-chamber 91. Steam is supplied to the chamber through a pipe 92, and a small outlet pipe and cock 93 communicates through the bottom with the steam-chamber to carry off any water that may accumulate from condensation.

The machine herein shown has its dies arranged for performing a series of operations each separate from the other and forming a step only in the succession of operations necessary to convert a blank into a plaited, edged and pressed, and embossed cap or cup; but I do not confine myself in practice to this arrangement.

The machine may be arranged as a double machine—that is, there may be two plaiting-dies and two edging and pressing dies. With such an arrangement two blanks may be simultaneously operated on. For this purpose die D³, opposite the plaiting-die D', (shown in Figs. 6 and 7, but not visible in Fig. 2,) would be a plaiting-die also, and dies D² and D⁴ would be edging and pressing dies, the former receiving the article from die D' and the latter from die D³. In such case but one fold would be given to the edge, but that is all that is necessary in many cases. With the dies arranged in the manner stated the machine is fed from both sides and two articles are simultaneously being produced.

I do not limit the use of the invention to the making of cups with flaring or tapering sides, as other forms—such as cylindrical cups and also oval or elliptical and other variations from the cylindrical form with straight or flaring sides—may be made by the machine with equal facility. It being necessary, of course, to shape the dies to correspond to the desired shape of the article and to obtain the proper form for the sides thereof, the angle of the plaiting-fingers and of the plunger and cup or outer die must correspond to the angle which the sides of the article bear to its bottom, and the flanges of the fingers must also be adjusted to the width of the plaits that are to be formed.

I claim—

1. In a machine for making plaited articles, a die for forming and plaiting the sides of the article, composed of an outer fixed part provided with grooves and plaiting-fingers that work in the said grooves and a disk to which the said fingers are pivoted, and an inner part consisting of a plunger provided with longitudinal grooves and plaiting-fingers pivoted to said plunger and arranged to work in and out of the grooves therein, substantially as specified.

2. The combination, in the outer part of the plaiting-die, of a suitably-shaped cup provided with the grooves 37 in its inner surface, with a vertically-movable disk 38 and plaiting-fingers F, pivoted at their lower ends to the disk and having their edges in the grooves 37, the construction being such that by the motion of the disk the said fingers are caused to vibrate from an upright position to a horizontal position and back again, substantially as specified.

3. The combination, in the inner part of the plaiting-die, with a plunger provided with longitudinal grooves and plaiting-fingers pivoted to the bottom of the plunger and arranged to vibrate in and out of the said grooves, of a sleeve placed on the plunger-rod and movable thereon, and rods 50, having one end pivoted to the sleeve and the other to the plaiting-fingers F', the construction being such that when the plunger moves downward the fingers are caused to enter the grooves by passing into the outer part of the die and when the plunger moves upward, the sleeve being stopped while the plunger and rod continue to move, the fingers are forced out of the grooves and to a horizontal position, substantially as specified.

4. A plaiting-finger for plaiting and forming dies, consisting of a flat plate of metal having its edge turned over at an obtuse angle and forming a flange 54, that increases in width from the lower end toward the upper end of the finger, substantially as specified.

5. The combination, in a plaiting-die, of an outer part having its inner surface provided with grooves of varying depths, and a disk to which are pivoted the plaiting-fingers F by their lower ends, the said fingers having their outer edges in the grooves of the outer part and their inner flanged edges outside of said grooves and all turned in the same direction, an inner part consisting of a grooved plunger to which are pivoted the lower ends of the plaiting-fingers F', whose inner edges are arranged to enter the grooves in the plunger while their flanged edges project out of the same, the said flanged edges all being turned in the same direction but opposite to the similar parts of fingers F, the sleeves on the plunger-rod and pivoted rods that connect the said sleeve with the fingers, and mechanism, substantially as described, for giving motion to the disk of the outer die and the plunger of the inner die, substantially as specified.

6. In a machine for making plaited cups, boxes, caps, &c., the combination, with the plaiting-die, of one or more pressing and edging dies geared with the plaiting-die and operating in harmony therewith, substantially as specified.

7. The pressing and edging mechanism herein described, the same consisting in the combination, with the pressing-die $D^2$, provided with the collar 59, and mechanism, substantially as described, for giving a positive motion to the inner part or plunger of said die, of an edge-turner placed over the said inner part or plunger, mechanism, substantially as described, for giving a positive downward motion to the edge-turner, and springs for giving an upward motion to the same, substantially as specified.

8. In combination with plaiting and pressing and edging dies arranged to operate in succession on the article, a gripper for transferring the article from the plaiting-die to the pressing die or dies, and mechanism, substantially as described, for moving the said gripper and closing and opening the same to seize and release the article at the proper moment, substantially as specified.

9. In combination with a series of grippers G G' $G^2$, interposed between the successive dies D', $D^2$, $D^3$, and $D^4$, the ring 65, provided with a toothed quadrant $q$, the rock-lever 81, cam 83, gearing connecting the ring 65 with the rock-lever 81, means for holding the rock-lever in contact with the cam, and devices, substantially as described, for closing the grippers at the point where the article is seized and opening the same at the point where it is released, substantially as specified.

10. The combination, with the mechanism for forming, plaiting, and finishing plaited cups, boxes, caps, &c., and the driving-shaft of the machine, of automatic trip mechanism for throwing the driving-shaft out of gear at every second revolution thereof, the said trip mechanism consisting substantially of a pinion 13 on the driving-shaft, spur-wheel 14, cam 16, connecting-rod 18, lever 19, arms 11, connecting with a clutch-box, arm 21, and bell-crank lever 22, connected with the treadle, the construction being such that at the end of each second revolution of the driving-shaft the clutch-box is raised out of connection with the clutch-wheel that meshes with the driving-shaft pinion and the bell-crank lever engages the arm 21 and retains the clutch-box out of connection with the clutch-wheel until tripped by the treadle, substantially as specified.

In testimony that I claim the foregoing as my invention I hereunto subscribe my name this 25th day of September, 1889.

MATTHEW VIERENGEL.

In presence of—
 FREDK. HAYNES,
 MARY I. FEATHERSTONE.